United States Patent
Shinohara (10) Patent No.: US 6,411,626 B1
(45) Date of Patent: Jun. 25, 2002

(54) CONNECTION NUMBER TRANSLATING DEVICE AND ITS METHOD FOR TRANSLATING CONNECTION NUMBER OBTAINED FROM INPUT ATM CELL TO SYSTEM-INSIDE NUMBER

(75) Inventor: Naoko Shinohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/082,366

(22) Filed: May 20, 1998

(30) Foreign Application Priority Data

May 21, 1997 (JP) .............................. 9-130206

(51) Int. Cl.[7] .............................................. H04L 12/28
(52) U.S. Cl. .................................. 370/397; 370/395.31
(58) Field of Search ................................ 370/389, 392, 370/395, 397, 399, 401, 409, 395.1, 395.2, 395.3, 395.31, 395.32, 395.53, 395.7

(56) References Cited

U.S. PATENT DOCUMENTS 5,440,547 A * 8/1995 Easki et al. ................ 370/395
5,453,981 A * 9/1995 Katsube et al. ............ 370/395
5,809,501 A * 9/1998 Noven ............................ 707/7
6,118,783 A * 9/2000 Kunito ........................ 370/399

FOREIGN PATENT DOCUMENTS

JP         4-196846         7/1992

* cited by examiner

Primary Examiner—Chau Nguyen
Assistant Examiner—Andrew Lee
(74) Attorney, Agent, or Firm—Scully, Scott, Murphy & Presser

(57) ABSTRACT

A connection number converting device comprises a Contents Addressable Memory storing combinations of information including VPI and VCI numbers and connection type as well as system-inside numbers associated with the respective combinations of information, a CAM access unit for retrieving a translation table based on the type information and the VPI and VCI numbers acquired from an input ATM cell, and a system-inside number judging unit for estimating the retrieval result by the CAM access unit so to supply a desired system-inside number, the CAM access unit performing retrieval two times in a first retrieving method of retrieving the translation table based on the VPI number and the type information indicating a VP connection and in a second retrieving method of retrieving the translation table based on the VPI and VCI numbers and the type information indicating a VC connection.

10 Claims, 7 Drawing Sheets

FIG. 3

| ITEM NUMBER | FIRST RETRIEVAL RESULT | SECOND RETRIEVAL RESULT | JUDGEMENT RESULT |
|---|---|---|---|
| a | CORRESPONDING ADDRESS | UNCONFORMITY | SYSTEM-INSIDE NUMBER (VP) |
| b | UNCONFORMITY | CORRESPONDING ADDRESS | SYSTEM-INSIDE NUMBER (VC) |
| c | UNCONFORMITY | UNCONFORMITY | NON-SETTING |
| d | PLURAL-CONFORMITY | — | BAD SETTING OF CONNECTION |
| e | — | PLURAL-CONFORMITY | BAD SETTING OF CONNECTION |
| f | CORRESPONDING ADDRESS | CORRESPONDING ADDRESS | BAD SETTING OF CONNECTION |

FIG. 4

| ADDRESS | DATA FIELD | | |
|---|---|---|---|
| SYSTEM-INSIDE NUMBER | VPI | VCI | TYPE FLAG |
| 007h | 0FFh | 00FFh | VC ( 0 ) |
| 006h | 0FFh | 0FFFh | VP ( 1 ) |
| 005h | 000h | 00FFh | VP ( 1 ) |
| 004h | 000h | 0FFFh | VP ( 1 ) |
| 003h | 001h | 0100h | VC ( 0 ) |
| 002h | 001h | 0100h | VC ( 0 ) |
| 001h | 002h | 0100h | VC ( 0 ) |
| 000h | 055h | 0100h | VP ( 1 ) |

FIG. 5

(a) INPUT CELL VALUE   VPI = 055h   VCI = 0100h

|  | RETRIEVAL VPI | RETRIEVAL VCI | RETRIEVAL TYPE FLAG | CORRESPONDING ADDRESS | UNCONFORMITY FLAG | PLURAL-CONFORMITY FLAG |
|---|---|---|---|---|---|---|
| FIRST RETRIEVAL | 055h | MASK | VP(1) | 000h | NIL | NIL |
| SECOND RETRIEVAL | 055h | 0100h | VP(0) | NIL | PRESENCE | NIL |

SYSTEM-INSIDE NUMBER = 000h (b) INPUT CELL VALUE   VPI = 002h   VCI = 0100h

|  | RETRIEVAL VPI | RETRIEVAL VCI | RETRIEVAL TYPE FLAG | CORRESPONDING ADDRESS | UNCONFORMITY FLAG | PLURAL-CONFORMITY FLAG |
|---|---|---|---|---|---|---|
| FIRST RETRIEVAL | 002h | MASK | VP(1) | NIL | PRESENCE | NIL |
| SECOND RETRIEVAL | 002h | 0100h | VP(0) | 001h | NIL | NIL |

SYSTEM-INSIDE NUMBER = 001h (c) INPUT CELL VALUE   VPI = 003h   VCI = 0100h

|  | RETRIEVAL VPI | RETRIEVAL VCI | RETRIEVAL TYPE FLAG | CORRESPONDING ADDRESS | UNCONFORMITY FLAG | PLURAL-CONFORMITY FLAG |
|---|---|---|---|---|---|---|
| FIRST RETRIEVAL | 003h | MASK | VP(1) | NIL | PRESENCE | NIL |
| SECOND RETRIEVAL | 003h | 0100h | VP(0) | NIL | PRESENCE | NIL |

SYSTEM-INSIDE NUMBER = NONE   NON-SETTING ALARM OUTPUT (d) INPUT CELL VALUE   VPI = 000h   VCI = 0FFFh

|  | RETRIEVAL VPI | RETRIEVAL VCI | RETRIEVAL TYPE FLAG | CORRESPONDING ADDRESS | UNCONFORMITY FLAG | PLURAL-CONFORMITY FLAG |
|---|---|---|---|---|---|---|
| FIRST RETRIEVAL | 000h | MASK | VP(1) | 004h | NIL | PRESENCE |
| SECOND RETRIEVAL | 000h | 0FFFh | VP(0) | NIL | PRESENCE | NIL |

SYSTEM-INSIDE NUMBER = NONE   BAD SETTING ALARM OUTPUT (e) INPUT CELL VALUE   VPI = 001h   VCI = 0100h

|  | RETRIEVAL VPI | RETRIEVAL VCI | RETRIEVAL TYPE FLAG | CORRESPONDING ADDRESS | UNCONFORMITY FLAG | PLURAL-CONFORMITY FLAG |
|---|---|---|---|---|---|---|
| FIRST RETRIEVAL | 001h | MASK | VP(1) | NIL | PRESENCE | NIL |
| SECOND RETRIEVAL | 001h | 0100h | VP(0) | 002h | NIL | PRESENCE |

SYSTEM-INSIDE NUMBER = NONE   BAD SETTING ALARM OUTPUT (f) INPUT CELL VALUE   VPI = 0FFh   VCI = 00FFh

|  | RETRIEVAL VPI | RETRIEVAL VCI | RETRIEVAL TYPE FLAG | CORRESPONDING ADDRESS | UNCONFORMITY FLAG | PLURAL-CONFORMITY FLAG |
|---|---|---|---|---|---|---|
| FIRST RETRIEVAL | 0FFh | MASK | VP(1) | 006h | NIL | NIL |
| SECOND RETRIEVAL | 0FFh | 00FFh | VP(0) | 007h | NIL | NIL |

SYSTEM-INSIDE NUMBER = NONE   BAD SETTING ALARM OUTPUT

CONNECTION NUMBER TRANSLATING DEVICE AND ITS METHOD FOR TRANSLATING CONNECTION NUMBER OBTAINED FROM INPUT ATM CELL TO SYSTEM-INSIDE NUMBER

BACKGROUNDS OF THE INVENTION

1. Field of the Invention

The present invention relates to a connection number translating device and its method for translating a connection number represented by VPI number and VCI number obtained from an input ATM cell to a system-inside number in an ATM communication system.

2. Description of the Related Art

It is necessary to translate a connection number represented by VPI (Virtual Path Identifier) number and VCI (Virtual Channel Identifier) number to a system-inside number, for example, when building a system in accordance with a part of all the connections represented by VPI and VCI numbers, in an ATM (A synchronous Transfer Mode) communication system. In some cases, a CAM (Contents Addressable Memory) may be used for this translation. Generally, a CAM may be used to translate the connection number to the system-inside number as well as to recognize address of LAN. This kind of conventional technique is disclosed in, for example, Japanese Patent Publication Laid-Open (Kokai) No. Heisei 6-205025, "Combination Hash Table and CAM Address Recognition", Japanese Patent Publication Laid-Open (kokai) No. Heisei 6-261078, "Table Retrieval Method and Router", Japanese Patent Publication Laid-Open (Kokai) No. Heisei 8-70319, "Packet Processing Method in LAN bridge system".

The Patent Publication No. Heisei 6-205025 discloses a technique of specifying destination at high speed by use of a hierarchical address format enabling direct retrieval of destination and retrieving address database by use of a CAM in an ATM communication system.

The Patent Publication No. Heisei 6-261078 discloses a technique adopted to register a many times-retrieved destination address in a cache memory by providing it with a correspondence table and a CAM as a cache memory for routing table retrieval, constituted in that a plurality of network interfaces within a router respectively comprise a filtering controller and a routing controller, the filtering controller including a filtering table, the routing controller including a CAM for putting a retrieval key, a correspondence table for putting a pointer, and a routing table.

The Patent Publication No. Heisei 8-70319 discloses a technique of taking in a packet on a system bus, filtering a destination address and a source address through a CAM, deciding abandonment or interruption of some object packet based on the filtering result of the destination address, and registering address data into a CAM when judging that it is necessary to learn the address from the filtering result of the source address.

Figure 6:
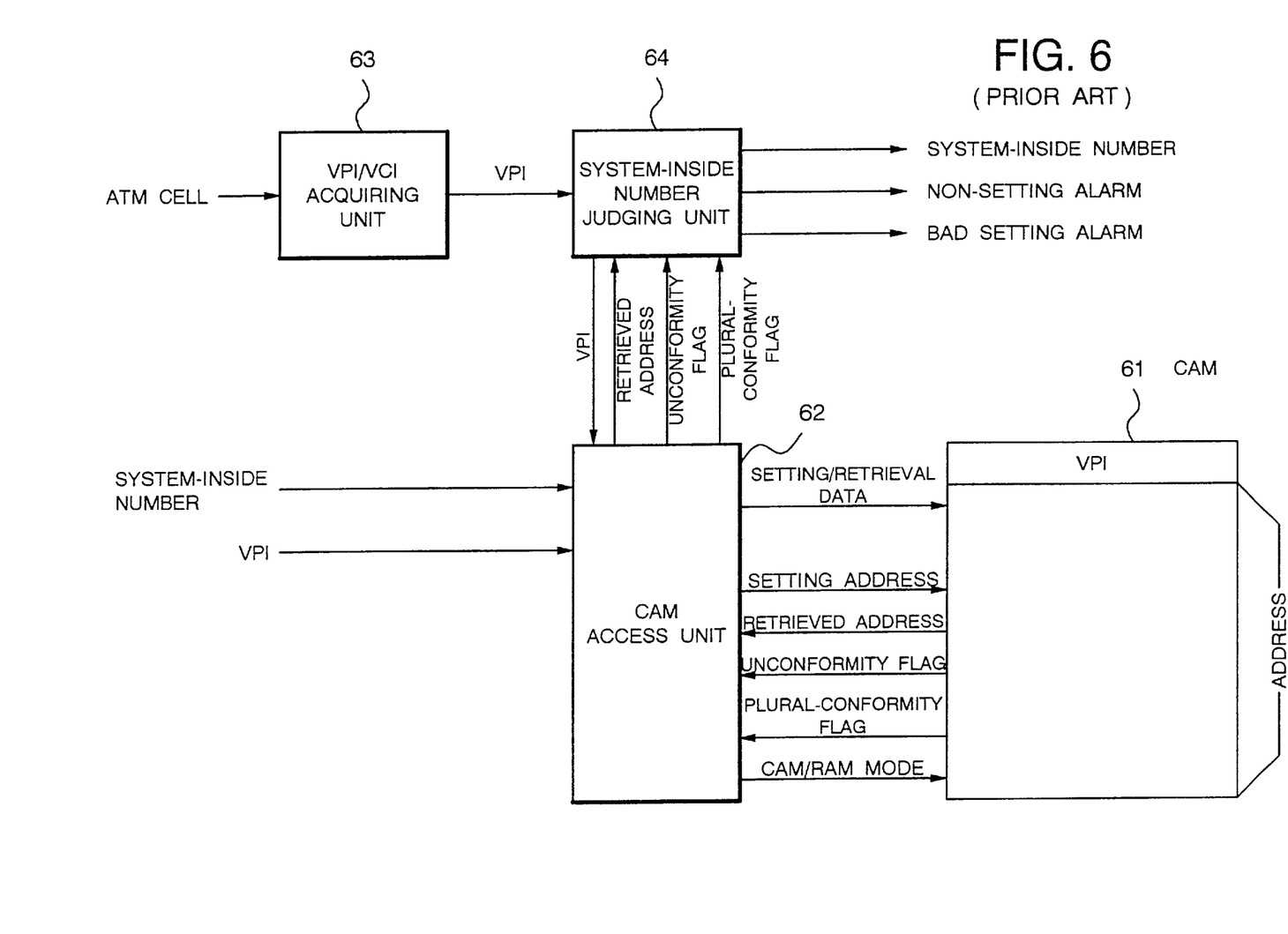
FIG. 6 is a block diagram showing an example of the conventional connection number translating device.
Figure 7:
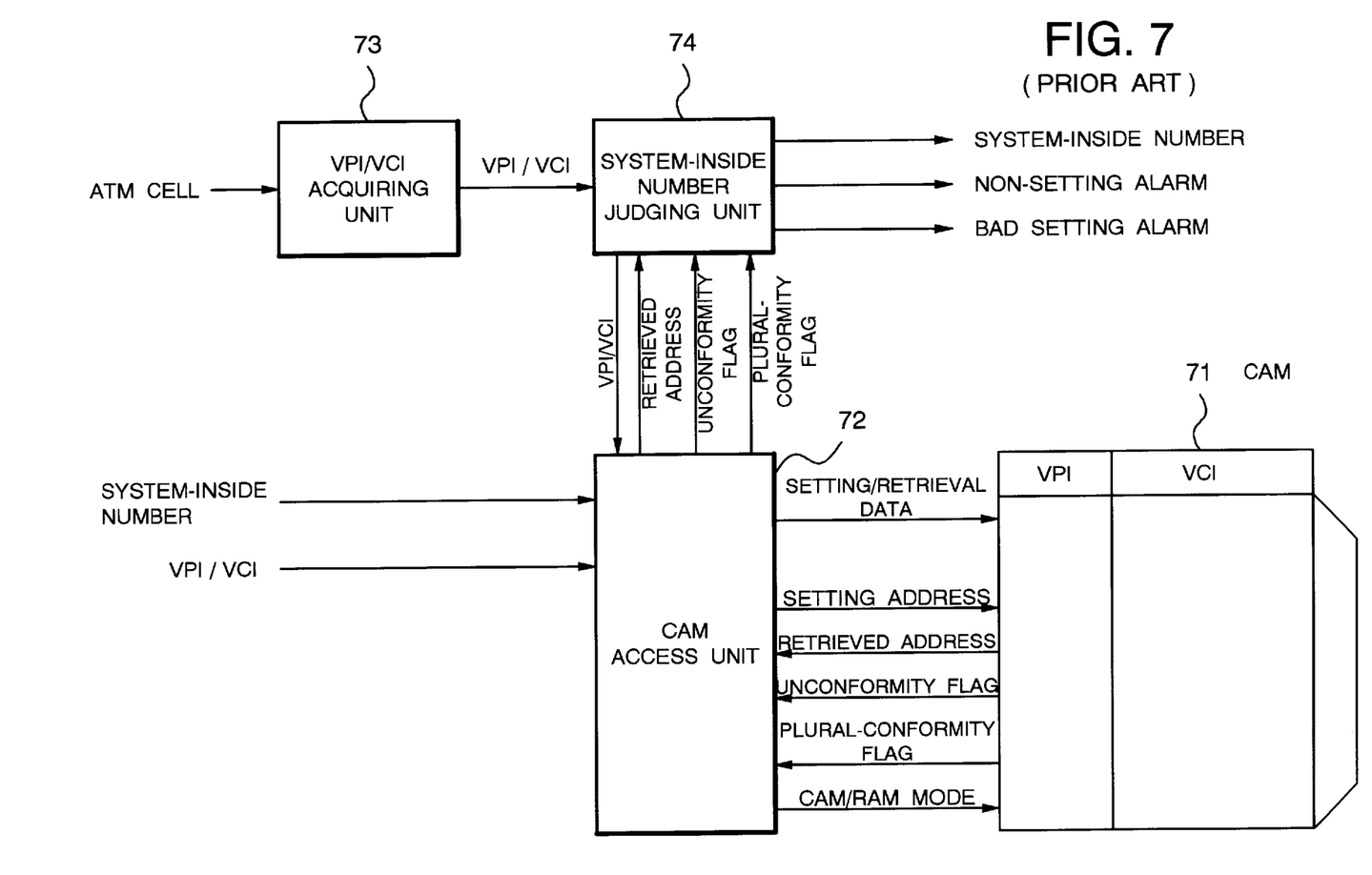
FIG. 7 is a block diagram showing another example of the conventional connection number translating device.

FIGS. 6 and 7 show constitutional examples of a translating device for translating a connection number to a system-inside number in this kind of the conventional technique. The translating device shown in FIG. 6 is a constitutional example in the case where a system operates associated with only the VP connection discriminated by the VPI number. The translation table of a CAM 61 consists of a data field with only the VPI numbers registered, and each address specified by each VPI number is associated with each system-inside number. A CAM access unit 62 performs the setting and retrieval of the CAM 61 as follows. At first, at the setting (RAM mode), only the VPI number is set on a CAM address corresponding to some system-inside number.

At the retrieval (CAM mode), a VPI/VCI acquiring unit 63 acquires the VPI number and the VCI number from the input ATM cell and supplies only the VPI number to the CAM access unit 62, and the CAM access unit 62 retrieves the CAM 61 based on the supplied VPI number. A retrieved address, an unconformity flag, and a plural-conformity flag, that are the results of this retrieval, are sent to a system-inside number judging unit 64 through the CAM access unit 62. The system-inside number judging unit 64 supplies the judgement result including the system-inside number, non-setting alarm, and bad setting alarm according to the retrieval result. When there exists a retrieved address, the retrieved address is supplied as the system-inside number, and when there exist a plurality of retrieved addresses, a plural-conformity flag is generated and the bad setting alarm is supplied. When there exists no retrieved address, an unconformity flag is generated and the non-setting alarm is supplied.

The translating device shown in FIG. 7 is a constitutional example in the case where a system operates associated with the VC connection discriminated by the VPI number and the VCI number. The translation table of a CAM 71 consists of a data field with the combinations of VPI numbers and VCI numbers registered, and the address specified by the data field is associated with the system-inside number. In this case, the CAM 71 is subject to connection setting by the VPI and VCI numbers at the setting (in RAM mode), and it is subject to retrieval by use of the both VPI and VCI numbers obtained from the input ATM cell at the retrieval (in CAM mode).

As mentioned above, in an ATM communication system, it is necessary to translate a connection number represented by the VPI and the VCI numbers to a system-inside number, for example, when building a system corresponding to a part of all the connection represented by the VPI and the VCI numbers. In this translation by use of a CAM, when the connection associated with a system is only the VP connection or only the VC connection, use of a single CAM, with the original connection number as the data and the corresponding system-inside number as the address, makes it easy to inversely look a required system-inside number (retrieved address) up. However, when a system to be realized deals with the VP connection and the VC connection at once, in other words, when there exist a mix of the VP connection and the VC connection, it is necessary to prepare a CAM for the VP connection and a CAM for the VC connection separately, resulting in an increase in hardware and cost.

SUMMARY OF THE INVENTION

An object of the present invention is to provide a connection number translating device and its method capable of translating a connection number without increasing the hardware amount, even in an ATM communication system of mixed VP and VC connections.

According to the first aspect of the invention, a connection number translating device for use in an ATM communication system for translating a connection number specified by VPI number and VCI number of an input ATM cell to a system-inside number, comprises acquiring means for acquiring the VPI number and the VCI number from the input ATM cell, a translation table storing combinations of information including VPI and VCI numbers and type information indicating the type of connection decided according to the VPI and VCI numbers as well as system-inside numbers associated with the respective combinations of information, retrieval means for retrieving the translation table based on the type information and the VPI and VCI numbers acquired by the acquiring means, and judging means for estimating the retrieval result by the retrieval means so to supply a desired system-inside number, wherein the retrieval means performing retrieval two times in a first retrieving method of retrieving the translation table, with the VCI number masked, based on the VPI number and the type information indicating a VP connection and in a second retrieving method of retrieving the translation table based on the VPI and VCI numbers and the type information indicating a VC connection, the judging means deciding a desired system-inside number based on the both retrieval results of the first and second retrieving methods.

In the preferred construction, the translation table registers the VPI and VCI numbers and the type information as the data and it is constituted by a Contents Addressable Memory having a data field including each system-inside number corresponding to each data as address.

In the preferred construction, the judging means judges the corresponding address as a system-inside number corresponding to the VP connection when the first retrieving method detects a corresponding address and the second retrieving method detects no corresponding address, and judges the corresponding address as a system-inside number corresponding to the VC connection when the first retrieving method detects no corresponding address and the second retrieving method detects a corresponding address.

In another preferred construction, the judging means judges the corresponding address as a system-inside number corresponding to the VP connection when the first retrieving method detects a corresponding address and the second retrieving method detects no corresponding address, judges the corresponding address as a system-inside number corresponding to the VC connection when the first retrieving method detects no corresponding address and the second retrieving method detects a corresponding address, judges that any system-inside number corresponding to a connection to be retrieved has not been set up in the translation table when the first and the second retrieving methods detect no corresponding address, and judges that a system-inside number corresponding to a connection to be retrieved has not been properly set up in the translation table, when either the first or the second retrieving method detects a corresponding address of plural-conformity and when both the first and second retrieving methods detect each corresponding address, thereby to supply a desired system-inside number or a message indicating the setting condition of the translation table, depending on the retrieval result of the retrieval means.

According to the second aspect of the invention, a connection number translating method for use in an ATM communication system for translating a connection number specified by VPI number and VCI number of an input ATM cell to a system-inside number, the method comprising the steps of a step of acquiring the VPI number and the VCI number from the input ATM cell, a step of storing combinations of information including VPI and VCI numbers and type information indicating the type of connection decided according to the VPI and VCI numbers as well as system-inside numbers associated with the respective combinations of information, a step of retrieving the translation table based on the type information and the VPI and VCI numbers acquired by the acquiring step, and a step of estimating the retrieval result by the retrieving step so to supply a desired system-inside number, the retrieving step includes, at least, a first retrieving step of retrieving the translation table, with the VCI number masked, based on the VPI number and the type information indicating a VP connection, and a second retrieving step of retrieving the translation table based on the VPI and VCI numbers and the type information indicating a VC connection, the judging step deciding a desired system-inside number based on the both retrieval results of the first and second retrieving steps.

In the preferred construction, in the judging step, when the first retrieving method detects a corresponding address and the second retrieving method detects no corresponding address, the corresponding address is judged as a system-inside number corresponding to the VP connection, and when the first retrieving method detects no corresponding address and the second retrieving method detects a corresponding address, the corresponding address is judged as a system-inside number corresponding to the VC connection.

In the preferred construction, the judging step further includes a step of examining the justness of the detected corresponding address and the setting condition of the translation table, depending on the retrieval result of the retrieving step, and a step of supplying a desired system-inside number or a message indicating the setting condition of the translation table, depending on the examination result, and in the examination step, when the first retrieving method detects a corresponding address and the second retrieving method detects no corresponding address, the corresponding address is judged as a system-inside number corresponding to the VP connection, when the first retrieving method detects no corresponding address and the second retrieving method detects a corresponding address, the corresponding address is judged as a system-inside number corresponding to the VC connection, when the first and the second retrieving methods detect no corresponding address, it is judged that any system-inside number corresponding to a connection to be retrieved has not been set up in the translation table, and when either the first or the second retrieving method detects a corresponding address of plural-conformity and when both the first and second retrieving methods detect each corresponding address, it is judged that a system-inside number corresponding to a connection to be retrieved has not been properly set up in the translation table.

According to the third aspect of the invention, a computer readable memory storing a control program for controlling a connection number translating device for use in an ATM communication system for translating a connection number specified by VPI number and VCI number of an input ATM cell to a system-inside number, the control program comprises a step of acquiring the VPI number and the VCI number from the input ATM cell, a step of storing combinations of information including VPI and VCI numbers and type information indicating the type of connection decided according to the VPI and VCI numbers as well as system-inside numbers associated with the respective combinations of information, a step of retrieving the translation table based on the type information and the VPI and VCI numbers acquired by the acquiring step, and a step of estimating the retrieval result by the retrieving step so to supply a desired system-inside number, the retrieving step includes, at least, a first retrieving step of retrieving the translation table, with the VCI number masked, based on the VPI number and the type information indicating a VP connection, and a second retrieving step of retrieving the translation table based on the VPI and VCI numbers and the type information indicating a VC connection, the judging step deciding a desired system-inside number based on the both retrieval results of the first and second retrieving steps.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a view showing concrete examples of each connection number obtained from an ATM cell and each corresponding CAM retrieval result.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The outline of the present invention will be described at first. In this embodiment, there used is a CAM capable of retrieving the data by masking some data bit and the CAM data field is divided into a VPI field, a VCI field, a type flag field for indicating a VP connection or a VC connection. In a system, system-inside number is regarded as the address on the CAM and each VPI number, VCI number, and type flag corresponding to each system-inside number is set up in advance as the data. Usually, when retrieving an ATM cell supplied to the system at the operation, by use of the VPI number and the type flag indicating the VP connection, a system-inside number corresponding to the VP connection can be obtained. While, when retrieving an ATM cell by use of the VPI number, the VCI number, and the type flag indicating the VC connection, a system-inside number corresponding to the VC connection can be obtained. Thus, even if the corresponding connection may be the VP connection or the VC connection, the connection number can be converted into a system-inside number with ease by use of a single CAM.

Figure 1:
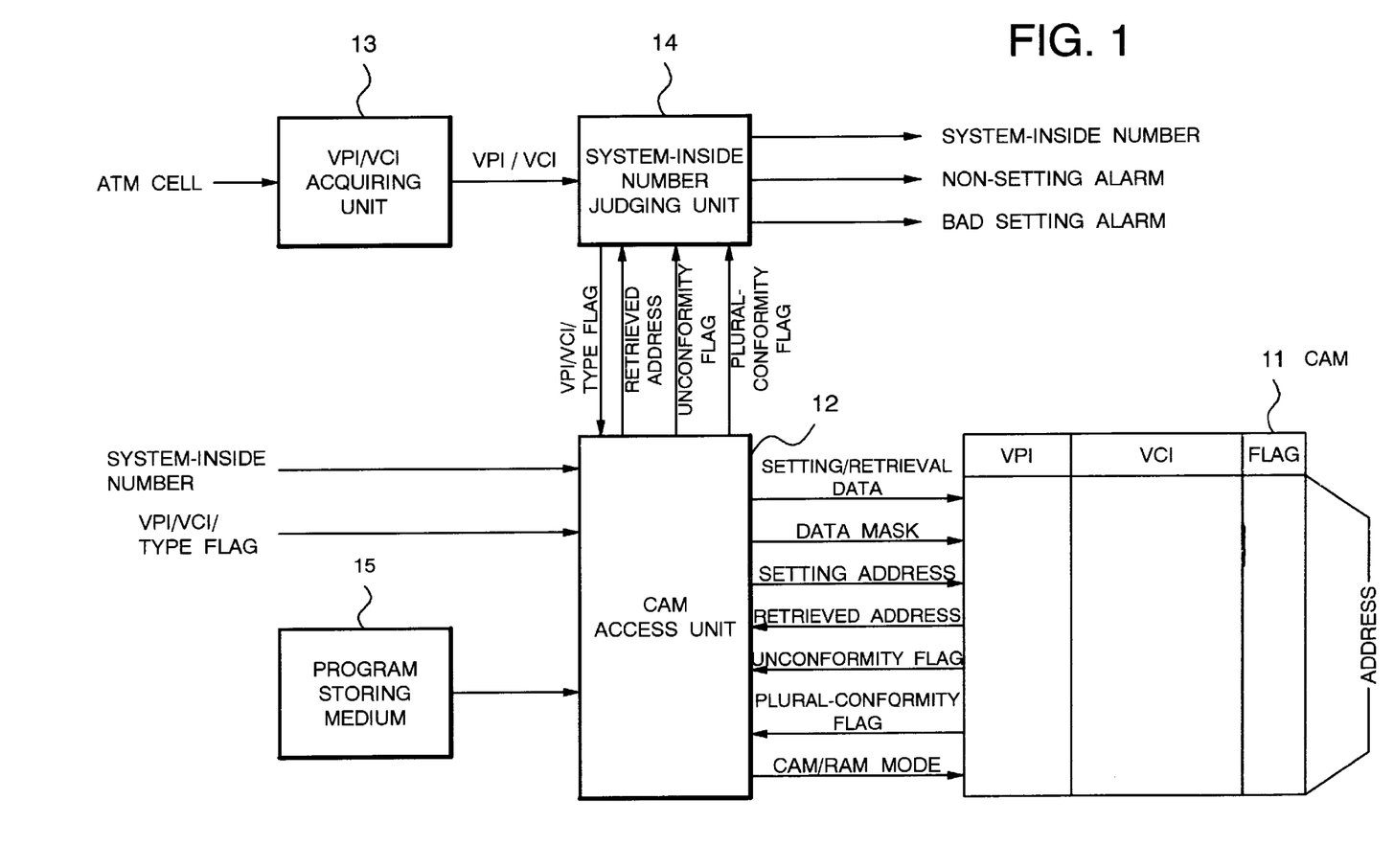
FIG. 1 is a block diagram showing the constitution of a connection number translating device according to an embodiment of the present invention.

FIG. 1 is a block diagram showing the constitution of a connection number translating device according to an embodiment of the present invention. With reference to FIG. 1, the connection number translating device of the embodiment comprises a CAM 11 having a translation table, a CAM access unit 12 for obtaining desired data through access to the CAM 11, a VPI/VCI acquiring unit 13 for acquiring the VPI number and the VCI number from an input ATM cell, and a system-inside number judging unit 14 for estimating the retrieval result of a system-inside number by the CAM access unit 12. In the components of this embodiment, the CAM access unit 12, the VPI/VCI acquiring unit 13, and the system-inside number judging unit 14 may be realized by, for example, a program-controlled CPU and an internal memory of a workstation terminal, a personal computer, or the other information processor. The control program controlling the CPU is provided, stored in a program storing medium 15 shown in FIG. 1, and it is loaded in an information processor. A magnetic disk, a semiconductor memory, or the other general storing medium can be used as the program storing medium 15.

Figure 4:
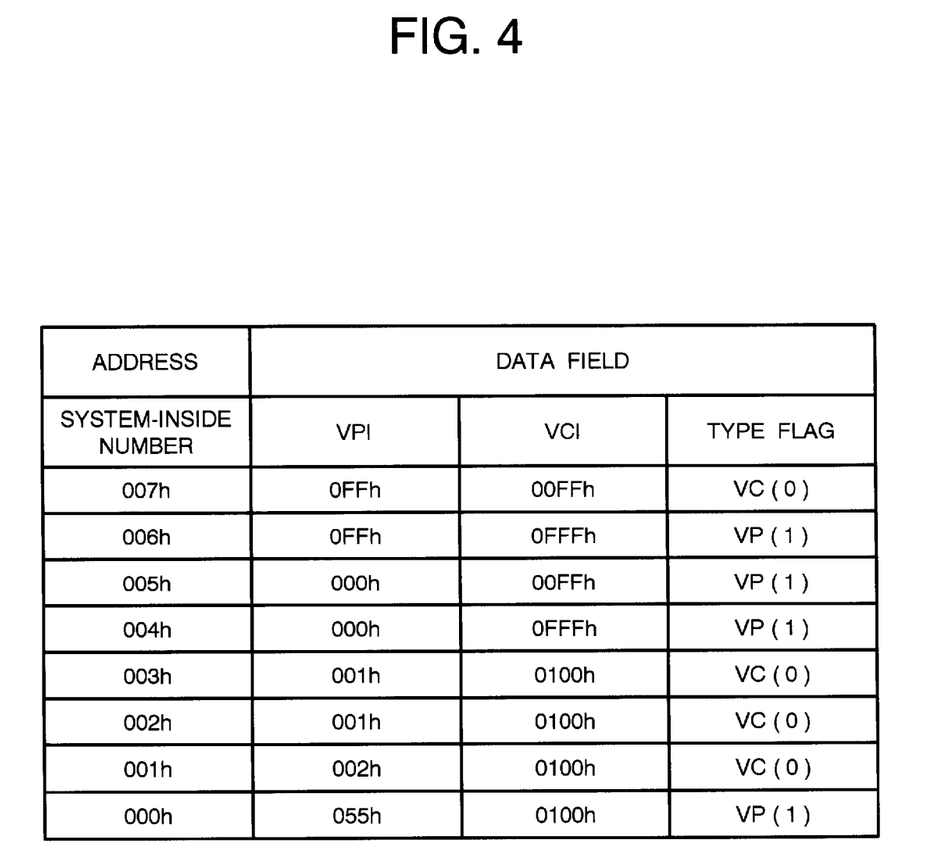
FIG. 4 is a view showing an example of the content of the CAM setting.

The CAM 11 consists of a data field with the combination of the VPI and VCI numbers and the type flag indicating the connection type (VP connection or VC connection) depending on the VPI number or the VCI number registered therein. The corresponding address of each combination in the data field becomes a system-inside number to be translated. FIG. 4 shows one example of the memory content (the content of the table) of the CAM 11.

The CAM 11 is controlled in the RAM mode at the data setting (at the time of registering), and, for example, a data field as shown in FIG. 4 is written in a corresponding address portion. It is controlled in the CAM mode at the data retrieval (at the time of translation processing to a system-inside number), and each data of the data field is used as a retrieval key in order to retrieve a corresponding address. At this retrieval, when there exists a corresponding address in accordance with a retrieval key, the retrieval address is supplied, when there exists no corresponding address in accordance with a retrieval key, an unconformity flag is supplied, and when there exist a plurality of such corresponding addresses, a plural-conformity flag is supplied.

In the CAM 11, the data to be retrieved can be limited by masking a part of the data at the retrieval. Therefore, with the VCI field masked, a system-inside number corresponding to the VP connection can be retrieved with the VPI field and the type flag indicating the VP connection as a retrieval key. A system-inside number corresponding to the VC connection can be retrieved without masking any data, with the VPI and VCI fields and the type flag indicating the VC connection as a retrieval key.

The CAM access unit 12 sets each data (VPI number, VCI number, type flag) corresponding to the system-inside number through access to the CAM 11, retrieves the CAM 11 according to the VPI number, the VCI number, and the type flag extracted by the VPI/VCI acquiring unit 13, and sends the retrieval result (a retrieved address, an unconformity flag, a plural-conformity flag described later) to the system-inside number judging unit 14.

The system-inside number judging unit 14 sends the VPI number, the VCI number, or the type flag obtained by the VPI/VCI acquiring unit 13 to the CAM access unit 12 as the data, and upon receipt of the retrieval result by the CAM access unit 12, it estimates the retrieval result.

The operation of the embodiment constituted as the above will be described this time. At first, the VPI and VCI numbers and the type flag indicating the VP connection or the VC connection are supplied to the connection number translating device of the embodiment, as the system-inside number and the connection number associated with it. These signals are set up on the CAM 11 in the RAM mode by the CAM access unit 12 with the system-inside number regarded as the address and with the VPI number, the VCI number, and the type flag regarded as the data. The type flag is set in one bit, for example, VP connection=1 and VC connection=0. This setting is performed on all the system-inside numbers for use in a system.

When translating the connection number recorded in the ATM cell to the system-inside number, the VPI/VCI acquiring unit 13 acquires the VPI number and the VCI number from an input ATM cell. The acquired VPI number and VCI number are delivered to the system-inside number judging unit 14, where they are used as the data in the retrieval two times as mentioned below.

Figure 2:
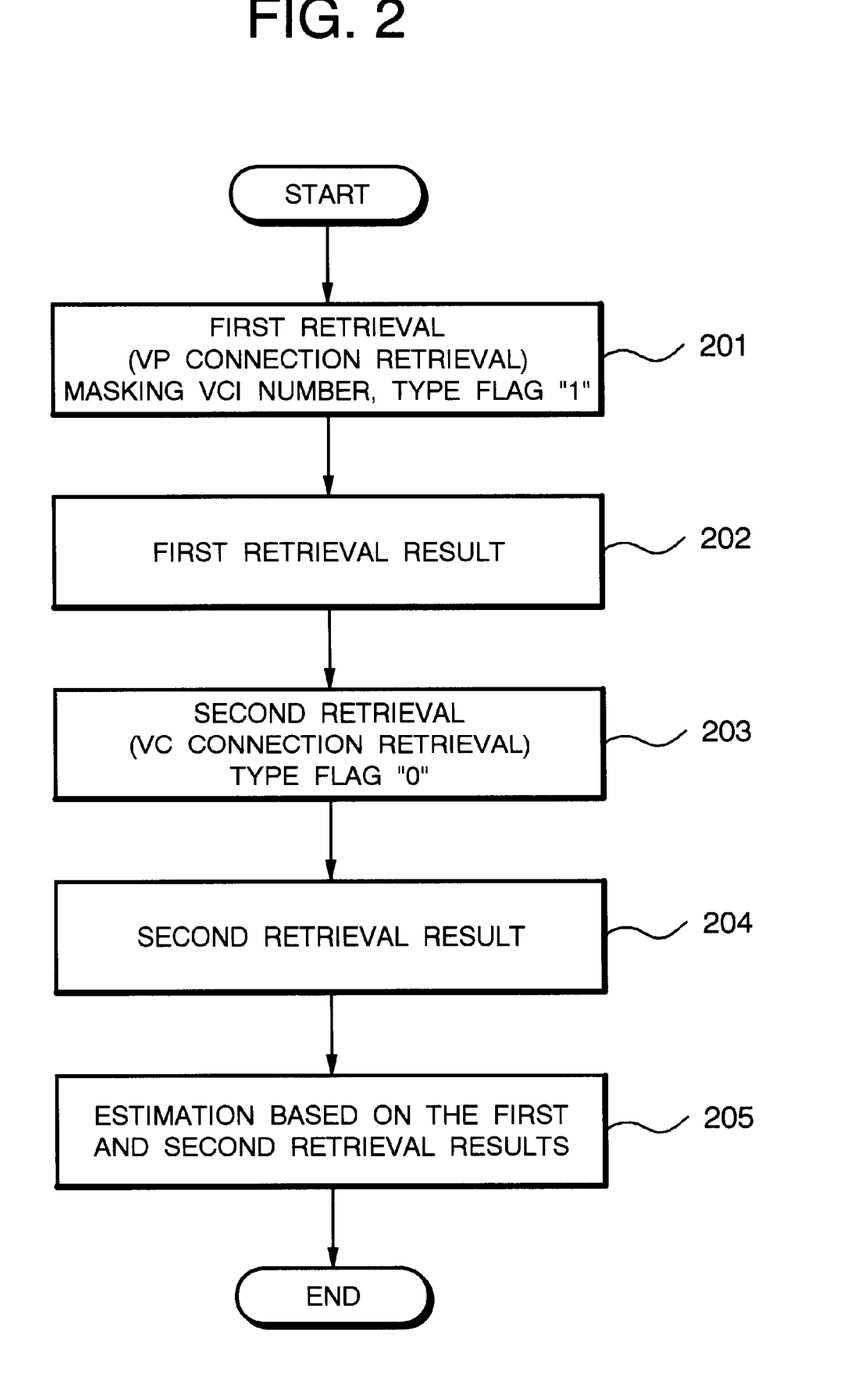
FIG. 2 is a flow chart showing a retrieval operation of a system-inside number according to the embodiment.

FIG. 2 is a flow chart showing the operation at the retrieval time. With reference to FIG. 2, the retrieval for VP connection is performed as the first retrieval (Step 201). Here, the VPI/VCI acquiring unit 13 delivers the VPI and VCI numbers and the type flag "1" indicating the VP connection, to the CAM access unit 12. The CAM access unit 12 sets up the received VPI and VCI numbers and the type flag in a data field, and further sets up a mask flag for masking the VCI field so that it should not be retrieved. The set data and mask flag are delivered to the CAM 11 and retrieval is performed in the CAM mode.

When there exists a corresponding VP connection in the CAM 11, the corresponding address is returned to the system-inside number judging unit 14 through the CAM access unit 12. When there exists no corresponding address, an unconformity flag is returned, and when there exist a plurality of corresponding addresses, the corresponding addresses and a plural-conformity flag are returned at a time (Step 202).

Retrieval for VC connection is performed as the second retrieval (Step 203). The VPI/VCI acquiring unit 13 delivers the VPI and VCI numbers and the type flag "0" indicating the VC connection, to the CAM access unit 12. The CAM access unit 12 sets up the received VPI and VCI numbers and the type flag in a data field. Since all the data fields are subject to retrieval, a mask flag is not set up this time. The set data and the mask flag never set up are delivered to the CAM 11 and retrieval is performed in the CAM mode.

When there exists a corresponding VC connection in the CAM 11, the corresponding address is returned to the system-inside number judging unit 14 through the CAM access unit 12. When there exists no corresponding address, an unconformity flag is returned, and when there exist a plurality of corresponding addresses, the corresponding addresses and a plural-conformity flag are returned at a time (Step 204).

Figure 3:
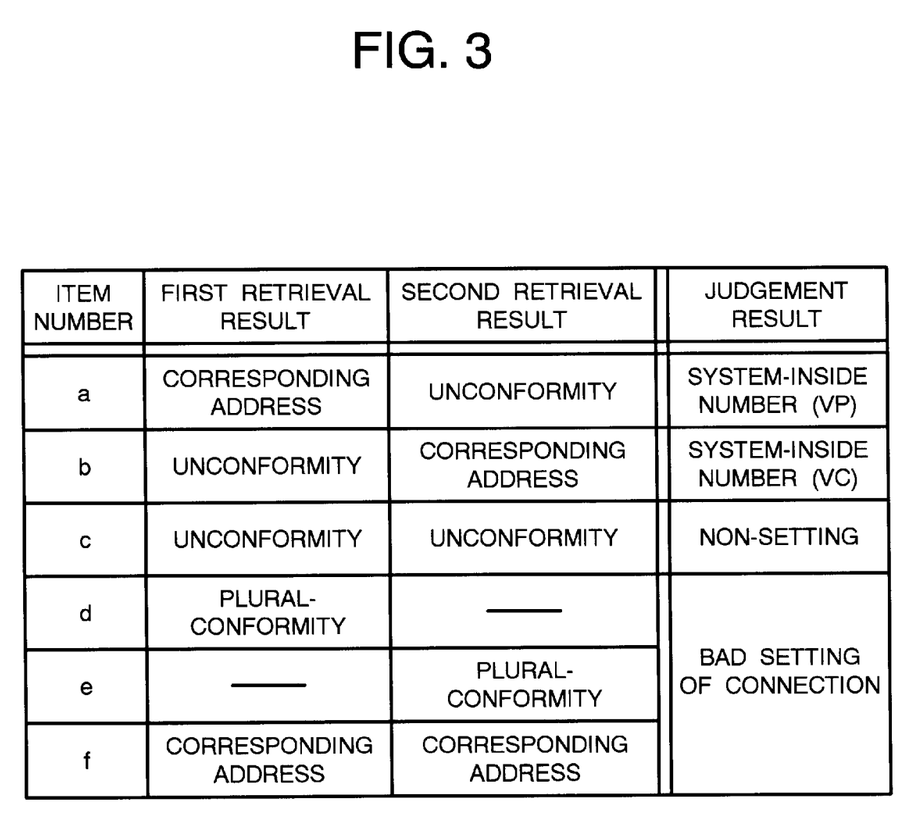
FIG. 3 is a judgement chart for use in estimation of a system-inside number according to a system-inside number judging unit of the embodiment.

Based on two items of data returned to the system-inside number judging unit 14 as the result of the both retrieval, the system-inside number corresponding to the connection number can be estimated according to a predetermined rule (Step 205). The estimation rule is shown in the judgement table of FIG. 3. Namely, if the system-inside number has been normally set up, the first retrieval hits the VP connection only (item number (a) of FIG. 3), and the second retrieval hits the VC connection only (item number (b) of FIG. 3). When the unconformity flags are returned in the both retrieval, it is judged that the connection has not been defined in the system (item number (c) of FIG. 3), and when a plural-conformity flag is returned in either retrieval, it is judged that the connection setting has not been performed correctly (item number (d) of FIG. 3). When there exists a corresponding address in the both first and second retrieval, it is also judged that the connection setting has not been performed correctly (item number (f) of FIG. 3). After the above estimation, the system-inside number judging unit 14 supplies either the obtained system-inside number, a non-setting alarm indicating that the setting is not performed in a system, or a bad-setting alarm indicating that the correct setting is not performed, depending on the judgement result.

The retrieval operation of a system-inside number according to the embodiment of the present invention will be described more specifically this time. In this operational example, the VPI and VCI numbers and the type flag indicating the VP connection or the VC connection are supplied to the connection number translating device as the system-inside number and the connection number associated with it. The type flag is set in one bit as VP connection=1 and VC connection=0.

Assume that the connection setting as shown in FIG. 4 is performed here. Eight types of connections as shown in FIG. 4 are set on the CAM 11 in the RAM mode by the CAM access unit 12 with each system-inside number regarded as the address and with the VPI and VCI numbers and the type flag regarded as the data.

When translating the connection number recorded in an ATM cell to a system-inside number, the VPI/VCI acquiring unit 13 acquires the VPI number and the VCI number from an input ATM cell at first. The acquired VPI number and VCI number are delivered to the system-inside number judging unit 14 and used as the date in the retrieval two times. Examples of the retrieval result and the estimation thereof are shown in FIG. 5. Assume that FIGS. 5 (a) to (f) respectively corresponds to the item numbers (a) to (f) of the judgement table of FIG. 3.

When the VPI/VCI numbers acquired from the input cell are 055h and 0100h ((a) of FIG. 5), the first retrieval is performed on the condition of VPI=055h, VCI=MASK, and the type flag "1", and as a result, 000h is obtained as the corresponding address. The second retrieval is performed on the condition of VPI=055h, VCI=0100h, and the type flag "0", and as a result, an unconformity flag is returned because there is no corresponding address. As the result of the both retrieval, the system-inside number judging unit 14 supplies the corresponding address 000h in the first retrieval (VP connection) as the system-inside number.

When the VPI/VCI numbers acquired from the input cell are 002h and 0100h ((b) of FIG. 5), the first retrieval is performed on the condition of VPI=002h, VCI=MASK, and the type flag "1", and as a result, an unconformity flag is returned because there is no corresponding address. The second retrieval is performed on the condition of VPI=002h, VCI=0100h, and the type flag "0", with the result that 001h is obtained as the corresponding address. As the result of the both retrieval, the system-inside number judging unit 14 supplies the corresponding address 001h in the second retrieval (VC connection) as the system-inside number.

When the VPI/VCI numbers acquired from the input cell are 003h and 0100h ((c) of FIG. 5), the first retrieval is performed on the condition of VPI=003h, VCI=MASK, and the type flag "1", and as a result, an unconformity flag is returned because there is no corresponding address. The second retrieval is performed on the condition of VPI=003h, VCI=0100h, and the type flag "0", and as a result, an unconformity flag is returned because there is no corresponding address. The system-inside number judging unit 14 judges that the system-inside number has not been set up yet since there is no corresponding address in the both retrieval, and supplies a non-setting alarm.

When the VPI/VCI numbers acquired from the input cell are 000h and 0FFFh ((d) of FIG. 5), the first retrieval is performed on the condition of VPI=000h, VCI=MASK, and the type flag "1", and as a result, a plural-conformity flag is returned since the identical VPI is defined also in 004h and 005h. The second retrieval is performed on the condition of VPI=000h, VCI=0FFFh, and the type flag "0", and as a result, an unconformity flag is returned because there is no corresponding address. As the result of the both retrieval, the system-inside number judging unit 14 judges that the setting of a system-inside number has not been properly performed and supplies a bad-setting alarm.

When the VPI/VCI numbers acquired from the input cell are 001h and 0100h ((e) of FIG. 5), the first retrieval is performed on the condition of VPI=001h, VCI=MASK, and the type flag "1", and as a result, an unconformity flag is returned because there is no corresponding address. The second retrieval is performed on the condition of VPI=001h, VCI=0100h, and the type flag "0", and as a result, a plural-conformity flag is returned because the identical VPI and the identical VCI have been defined also in 002h and 003h. As the result of the both retrieval, the system-inside number judging unit 14 judges that the setting of the system-inside number has not been performed correctly and supplies a bad setting alarm.

When the VPI/VCI numbers acquired from the input cell are 0FFh and 00FFh ((f) of FIG. 5), the first retrieval is performed on the condition of VPI=0FFh, VCI=MASK, and the type flag "1", and as a result, 006h is obtained as the corresponding address. The second retrieval is performed on the condition of VPI=0FFh, VCI=00FFh, and the type flag "0", and as a result, 007h is obtained as the corresponding address. In the both retrieval, although 006h and 007h are respectively hit in the first retrieval (VP connection) and the second retrieval (VC connection), it is impossible to deal with the VP connection and the VC connection simultaneously. Therefore, the system-inside number judging unit 14 judges that the system-inside number has not been properly set up and supplies a bad-setting alarm.

As mentioned above, the connection number translating device and its method of the present invention is capable of coping with a system having mixed VP and VC connections by use of a single CAM, when translating a connection number represented by the VPI number and the VCI number to a system-inside number, in an ATM communication system. Therefore, it is possible to do the translation of the connection number with a smaller amount of hardware and restrain the increase in cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A connection number translating device for use in an ATM communication system for translating a connection number specified by VPI number and VCI number of an input ATM cell to a system-inside number, comprising:

acquiring means for acquiring the VPI number and the VCI number from the input ATM cell;

a translation table storing combinations of information including VPI and VCI numbers and type information indicating the type of connection decided according to the VPI and VCI numbers as well as system-inside numbers associated with the respective combinations of information;

retrieval means for retrieving said translation table based on the type information and the VPI and VCI numbers acquired by said acquiring means; and judging means for estimating the retrieval result by said retrieval means so to supply a desired system-inside number, wherein said retrieval means performing retrieval two times in a first retrieving method of retrieving said translation table, with the VCI number masked, based on the VPI number and the type information indicating a VP connection and in a second retrieving method of retrieving said translation table based on the VPI and VCI numbers and the type information indicating a VC connection, said judging means deciding a desired system-inside number based on the both retrieval results of the first and second retrieving methods.

2. A connection number translating device as set forth in claim 1, wherein said translation table registers the VPI and VCI numbers and the type information as the data and it is constituted by a Contents Addressable Memory having a data field including each system-inside number corresponding to each data as address.

3. A connection number translating device as set forth in claim 1, wherein said judging means judges the corresponding address as a system-inside number corresponding to the VP connection when the first retrieving method detects a corresponding address and the second retrieving method detects no corresponding address, and judges the corresponding address as a system-inside number corresponding to the VC connection when the first retrieving method detects no corresponding address and the second retrieving method detects a corresponding address.

4. A connection number translating device as set forth in claim 1, wherein said judging means judges the corresponding address as a system-inside number corresponding to the VP connection when the first retrieving method detects a corresponding address and the second retrieving method detects no corresponding address, judges the corresponding address as a system-inside number corresponding to the VC connection when the first retrieving method detects no corresponding address and the second retrieving method detects a corresponding address, judges that any system-inside number corresponding to a connection to be retrieved has not been set up in said translation table when the first and the second retrieving methods detect no corresponding address, and judges that a system-inside number corresponding to a connection to be retrieved has not been properly set up in said translation table, when either the first or the second retrieving method detects a corresponding address of plural-conformity and when both the first and second retrieving methods detect each corresponding address, thereby to supply a desired system-inside number or a message indicating the setting condition of said translation table, depending on the retrieval result of said retrieval means.

5. A connection number translating method for use in an ATM communication system for translating a connection number specified by VPI number and VCI number of an input ATM cell to a system-inside number, the method comprising the steps of:

a step of acquiring the VPI number and the VCI number from the input ATM cell;

a step of storing combinations of information including VPI and VCI numbers and type information indicating the type of connection decided according to the VPI and VCI numbers as well as system-inside numbers associated with the respective combinations of information;

a step of retrieving said translation table based on the type information and the VPI and VCI numbers acquired by said acquiring step; and a judging step of estimating the retrieval result by said retrieving step so to supply a desired system-inside number, said retrieving step including, at least, a first retrieving step of retrieving said translation table, with the VCI number masked, based on the VPI number and the type information indicating a VP connection, and a second retrieving step of retrieving said translation table based on the VPI and VCI numbers and the type information indicating a VC connection, said judging step deciding a desired system-inside number based on the both retrieval results of the first and second retrieving steps.

6. A connection number translating method as set forth in claim 5, wherein in said judging step, when said first retrieving step detects a corresponding address and said second retrieving step detects no corresponding address, the corresponding address is judged as a system-inside number corresponding to the VP connection, and when said first retrieving step detects no corresponding address and said second retrieving step detects a corresponding address, the corresponding address is judged as a system-inside number corresponding to the VC connection.

7. A connection number translating step as set forth in claim 5, wherein said judging step further including a step of examining the justness of the detected corresponding address and the setting condition of said translation table, depending on the retrieval result of said retrieving step, and a step of supplying a desired system-inside number or a message indicating the setting condition of said translation table, depending on the examination result, and in said examination step, when said first retrieving step detects a corresponding address and said second retrieving step detects no corresponding address, the corresponding address is judged as a system-inside number corresponding to said the VP connection, when said first retrieving step detects no corresponding address and said second retrieving step detects a corresponding address, the corresponding address is judged as a system-inside number corresponding to the VC connection, when said first and said second retrieving steps detect no corresponding address, it is judged that any system-inside number corresponding to a connection to be retrieved has not been set up in said translation table, and when either said first or said second retrieving step detects a corresponding address of plural-conformity and when both said first and said second retrieving steps detect each corresponding address, it is judged that a system-inside number corresponding to a connection to be retrieved has not been properly set up in said translation table.

8. A computer readable memory storing a control program for controlling a connection number translating device for use in an ATM communication system for translating a connection number specified by VPI number and VCI number of an input ATM cell to a system-inside number, the control program comprising:

a step of acquiring the VPI number and the VCI number from the input ATM cell;

a step of storing combinations of information including VPI and VCI numbers and type information indicating the type of connection decided according to the VPI and VCI numbers as well as system-inside numbers associated with the respective combinations of information;

a step of retrieving said translation table based on the type information and the VPI and VCI numbers acquired by said acquiring step; and a judging step of estimating the retrieval result by said retrieving step so to supply a desired system-inside number, said retrieving step including, at least, a first retrieving step of retrieving said translation table, with the VCI number masked, based on the VPI number and the type information indicating a VP connection, and a second retrieving step of retrieving said translation table based on the VPI and VCI numbers and the type information indicating a VC connection, said judging step deciding a desired system-inside number based on the both retrieval results of the first and second retrieving steps.

9. A computer readable memory as set forth in claim 8, wherein
   in said judging step of the control program,
      when said the first retrieving step detects a corresponding address and said second retrieving step detects no corresponding address, the corresponding address is judged as a system-inside number corresponding to the VP connection, and
      when said first retrieving step detects no corresponding address and said second retrieving step detects a corresponding address, the corresponding address is judged as a system-inside number corresponding to the VC connection.

10. A computer readable memory as set forth in claim 8, wherein
   said judging step of the control program further including
      a step of examining the justness of the detected corresponding address and the setting condition of said translation table, depending on the retrieval result of said retrieving step, and
      a step of supplying a desired system-inside number or a message indicating the setting condition of said translation table, depending on the examination result,
      in said examination step,
         when said first retrieving step detects a corresponding address and said second retrieving step detects no corresponding address, the corresponding address is judged as a system-inside number corresponding to the VP connection,
         when said first retrieving step detects no corresponding address and said second retrieving step detects a corresponding address, the corresponding address is judged as a system-inside number corresponding to the VC connection,
         when said first and said second retrieving steps detect no corresponding address, it is judged that any system-inside number corresponding to a connection to be retrieved has not been set up in said translation table, and
         when either said first or said second retrieving step detects a corresponding address of plural-conformity and when both said first and said second retrieving steps detect each corresponding address, it is judged that a system-inside number corresponding to a connection to be retrieved has not been properly set up in said translation table.

\* \* \* \* \*